Patented Oct. 17, 1933

1,930,751

UNITED STATES PATENT OFFICE 1,930,751

CHLORINATION OF O-TOLUIDINE

Emeric Havas and Henry R. Lee, South Milwaukee, Wis., assignors, by mesne assignments, to E. I. du Pont de Nemours & Company, a corporation of Delaware No Drawing. Application April 20, 1931
Serial No. 531,644

13 Claims. (Cl. 260—124)

This invention relates to a process of chlorinating ortho-toluidine, to produce 1-methyl-2-amino-5-chloro-benzene.

It is an object of this invention to devise a simple, economical and efficient method for obtaining 1-methyl-2-amino-5-chloro-benzene in a high state of purity.

Other and further important objects of this invention will become apparent from the following description and appended claims.

1-methyl-2-amino-5-chloro-benzene constitutes a valuable intermediate for dyestuffs. It has been prepared in the art by a process comprising substantially the following steps:

(a) Conversion of o-toluidine to the corresponding acetyl derivative by treatment with acetic anhydride in glacial acetic acid.

(b) Chlorination of the acetyl compound thus formed in glacial or concentrated acetic acid by means of chlorine or sodium chlorate and hydrochloric acid (Lellman & Klotz, Annalen, vol. 231, pages 317–318; Reverdin & Crepieux, Berichte, vol. 33, page 2499).

(c) Separation of the chlorinated aceto-toluidide from the acetic acid, generally by diluting the reaction mass with water and filtering (Reverdin & Crepieux, ibid).

(d) Purification of the chlorinated compound; more particularly, separation of the 5-chloro compound from its isomers and other halogen derivatives; generally by recrystallization from alcohol.

(e) Hydrolysis of the chlorinated-aceto-toluidide with caustic soda to give the free base, or with hydrochloric acid to give the hydrochloride thereof. (Lellman & Klotz and Reverdin & Crepieux, above).

(f) Final purification by steam distillation.

In British Patent No. 294,462 a modification of the above processes has been proposed, whereby instead of converting the ortho-toluidine in step (a) into its acetyl derivative, it is converted into the corresponding o-toluene-sulfonyl derivative, the remaining steps being substantially as above outlined. It is claimed that this modification produces a more homogeneous product, avoiding the formation of isomers or higher halogen derivatives. The yield, however, has not been stated, and it is not clear if no isomers have been formed at all in the process, or if a more efficient separation of the 5-chloro-2-acidyl-amino-1-toluene from its isomers is obtained.

In all the above processes large quantities of glacial acetic acid are necessary. A large portion of this is practically completely wasted in the dilution step, since recovery of acetic acid from a dilute solution is a costly operation, and will at best return only a small fraction of the initial cost of the acid.

In those processes also, large quantities of hydrochloric acid are required for hydrolysis, because of the diluting action effected by the acetic acid and water physically held in the filtration mass. Although 1 mole of HCl is formed in the chlorination step for each mole of toluidine chlorinated, this is entirely lost in the filtration step and therefore is not available for the hydrolysis step. Furthermore the step of separating the chlorinated acidyl-amino compound from the acetic acid itself also constitutes a waste since it consumes labor, time, and plant equipment. On the other hand, this step cannot be dispensed with, because in view of the large quantity of acetic acid present in the mass and in view of its diluting action upon the HCl, excessively large and impractical quantities of the latter would be required to effect hydrolysis.

Another big disadvantage of all these processes is that the acidylating agents used, acetic anhydride, ortho-toluene-sulfo-chloride and the like, are very expensive, and are practically completely wasted.

We have now found that by converting o-toluidine prior to chlorination into its corresponding formyl derivative, the entire process becomes susceptible of a series of simplifications and economies, which increase the efficiency of the entire process, considerably cut down its cost, and facilitate the separation of the desirable product from its isomers.

The first and immediate advantage of the use of formic acid as acidylating agent, is that it costs considerably less, mole for mole, than acetic anhydride or o-toluene-sulfo-chloride. This is due both to its lesser weight per mole and to its lower cost per pound than the acidylating agents used heretofore.

Another important advantage made possible by the use of formic acid is available, since the formyl compound of o-toluidine which is formed is highly soluble in water-insoluble organic solvents such as toluene or benzene. This permits performing the entire process, namely, the chlorination and the hydrolysis, in an inert organic medium, such as, for example, toluene, which can be efficiently recovered at the end of the reaction. Moreover, the use of toluene as a solvent in the chlorination step enables one to eliminate the heretofore necessary step of separating the chlorinated compound from the solvent before hydrolysis. Thus the materials, labor, and time heretofore consumed in this step are saved. Furthermore, the use of toluene saves the hydrochloric acid formed in the chlorination step, and cuts down the quantity of hydrochloric acid required for hydrolysis to a mere fraction of the quantity required in heretofore known processes.

Other material advantages from the selection of formic acid as acidylating agent, and of an inert organic hydrocarbon as solvent, will appear from the detailed description below.

Without limiting our invention to any particular procedure, the following example in which parts by weight are given, will serve to illustrate our method in its preferred form.

*Example*

321 parts of o-toluidine, and 180 parts of 90% formic acid are heated together at about 100 to 103° C. for about 3 hours. The mass is then cooled to about 70° C., and 750 parts of toluene are added. The mass is now heated to distill off the excess of formic acid as well as any water that might be present, and then cooled to about 60° C. Additional toluene is now introduced into the mass to bring the total quantity of toluene to about 1400 parts. The toluene diluted mass is cooled to about 20° C., and chlorine gas is passed through the mixture until about 234 parts have been consumed. 175 parts of water are now added, and 260 parts of an aqueous hydrochloric acid solution (20° Bé.) are introduced. The mass is heated at about 60° C. for about 2 hours, cooled to 20° C. and filtered. The filter cake is dried by suction, and constitutes the hydrochloride of 5-chloro-2-amino-1-toluene in high yield, and of sufficient purity to be applicable directly for technical purposes.

The filtrate consists of two phases: (1) An aqueous phase containing dissolved therein the excess hydrochloric acid and the hydrochloride of any isomeric chloro-toluidines formed and (2) an oily phase from which the toluene may be recovered in pure form by steam distillation.

It will thus be seen that our novel process is exceedingly simple in operation, reduces the handling of materials to a minimum, saves hydrochloric acid, replaces the costly acidylating agent by the comparatively cheap formic acid, uses an inexpensive solvent for the reaction, and enables the recovery of the same without waste and at very little cost. Due to the great reduction in liquid volumes handled and the substantial absence of dilute solvents, the separation of 5-chloro-2-amino-1-toluene from its isomers is more complete and the product is obtained in a comparatively pure state.

If desired, the various intermediate products formed in the reaction may be isolated. The treatment of ortho-toluidine with formic acid in the first step of the above process results in formylamino-o-toluene. The chlorination of this product according to the above process yields 5-chloro-2-formylamino-1-toluene and some isomeric derivatives. These chlorinated compounds may be isolated by neutralizing the reaction mass, and distilling off the toluene. The 5-chloro-compound may be separated from its isomers by recrystallizing from alcohol. It is a white crystalline substance, melting at 122° C. It is soluble in toluene and other organic solvents. When a toluene solution thereof is treated with aqueous hydrochloric acid solution, the formyl group splits off, and the resulting amino group is converted into the HCl salt, which is insoluble in toluene, and therefore either dissolves in the aqueous phase or precipitates.

It will be understood that many variations and modifications are possible in the specific procedure disclosed, without departing from the spirit of this invention.

Thus, instead of chlorine gas, other chlorinating agents which are adapted for use in anhydrous media may be used; for instance, sulfuryl chloride. Instead of toluene any other organic solvent may be used, provided it is a good solvent for formyl-ortho-toluidine, a poor solvent for hydrochloric acid, immiscible with water, and not readily chlorinated at low temperatures in the absence of a catalyst. Benzenoid solvents such as, for instance, benzene and chloro-benzene are specific examples of solvents that may be used in place of toluene.

By the term "a 5-chloro-2-amino-1-toluene compound" as used in the claims we mean the free base 5-chloro-2-amino-1-toluene as well as salts thereof such as for example the hydrochloride.

We claim:

1. In the process of manufacturing a chlorinated ortho-toluidine compound, the step which comprises chlorinating formylamino-o-toluene.

2. In the process of manufacturing 5-chloro-2-amino-1-toluene, the steps comprising chlorinating formylamino-o-toluene and hydrolyzing the product to eliminate the formyl group.

3. As a new product, 5-chloro-2-formylamino-1-toluene.

4. In the process of chlorinating ortho-toluidine, the steps comprising reacting ortho-toluidine with formic acid, chlorinating the reaction product formed and hydrolyzing the resulting chlorinated product to eliminate the formyl group.

5. In the process of manufacturing clorinated ortho-toluidine, the step which comprises effecting the chlorination of formyl-ortho-toluidine in an organic liquid medium which is immiscible in water.

6. In the process of manufacturing chlorinated ortho-toluidine, the step which comprises, reacting with a chlorinating agent, formylamino-o-toluene dissolved in a benzenoid solvent.

7. In the process of manufacturing chlorinated ortho-toluidine, the step which comprises effecting the chlorination of formylamino-o-toluene in a medium of toluene.

8. In the process of preparing chlorinated ortho-toluidine, the step which comprises passing chlorine gas into a solution of formylamino-o-toluene in toluene.

9. A process of preparing a 5-chloro-2-amino-1-toluene compound, which comprises, passing chlorine gas into a solution of formylamino-o-toluene in toluene, adding an aqueous hydrochloric acid solution, warming the mass to effect hydrolysis, and recovering the precipitated hydrochloride of 5-chloro-2-amino-1-toluene.

10. The process of preparing a 5-chloro-2-amino-1-toluene compound which comprises, reacting upon amino-o-toluene with formic acid to produce formylamino-o-toluene, dissolving the latter in toluene, heating the mixture to eliminate excess formic acid and water, passing chlorine gas into the toluene solution of the formylamino-o-toluene, adding an aqueous hydrochloric acid solution, warming the mass to effect hydrolysis, and filtering to isolate the hydrochloride of 5-chloro-2-amino-1-toluene.

11. In the process of preparing a 5-chloro-2- amino-1-toluene compound, the step which comprises heating together for about three hours ortho-toluidine and formic acid at temperatures around 100° C. to produce formylamino-o-toluene, cooling the reaction mass, dissolving the latter in toluene, heating the solution to distill off excess formic acid and water, passing chlorine gas into the toluene solution of the formylamino-o-toluene, adding an aqueous solution of hydrochloric acid, warming the mass at about 60° C. to effect hydrolysis and isolating the hydrochloride of 5-chloro-2-amino-1-toluene.

12. In the process of chlorinating ortho-toluidine, the steps which comprise reacting ortho-toluidine with formic acid, chlorinating the reaction product in a medium of benzene with sulfuryl chloride and hydrolyzing the resulting chlorinated product to eliminate the formyl group.

13. In the process of chlorinating ortho-toluidine, the steps which comprise reacting ortho-toluidine with formic acid to produce formylamino-o-toluene, chlorinating the said reaction product in a medium of chloro benzene, adding an aqueous hydrochloric acid solution, heating the mass to effect hydrolysis and recovering the resulting hydrochloride produced.

EMERIC HAVAS.
HENRY R. LEE.